(12) United States Patent
Kim et al.

(10) Patent No.: US 9,582,049 B2
(45) Date of Patent: Feb. 28, 2017

(54) METHOD AND DEVICE FOR CONTROLLING USER INTERFACE BASED ON USER'S GESTURE

(75) Inventors: Joo Min Kim, Seoul (KR); Youk Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 937 days.

(21) Appl. No.: 12/196,080

(22) Filed: Aug. 21, 2008

(65) Prior Publication Data

US 2009/0265627 A1 Oct. 22, 2009

(30) Foreign Application Priority Data

Apr. 17, 2008 (KR) .................. 10-2008-0035556
Jul. 14, 2008 (KR) .................. 10-2008-0068312

(51) Int. Cl.
| | | |
|---|---|---|
| G06F 3/00 | (2006.01) | |
| G06F 9/00 | (2006.01) | |
| G06F 17/00 | (2006.01) | |
| G06F 1/16 | (2006.01) | |
| G06F 3/0485 | (2013.01) | |

(52) U.S. Cl.
CPC ............ *G06F 1/1694* (2013.01); *G06F 1/1626* (2013.01); *G06F 3/0485* (2013.01); *G06F 2200/1637* (2013.01)

(58) Field of Classification Search
CPC .... G06F 1/1694; G06F 1/1626; G06F 3/0485; G06F 3/0484; G06F 9/4443; G06F 8/34; G06F 3/0486; G06F 8/38; G06F 3/0481; G06F 3/0482; G06F 3/04812; G06F 3/04847; G06Q 10/10; H04N 1/00389; H04N 1/00411

USPC ............. 715/762, 763, 765, 744, 864, 865
See application file for complete search history.

(56) References Cited

U.S. PATENT DOCUMENTS

| | | | |
|---|---|---|---|
| 6,421,064 B1 * | 7/2002 | Lemelson et al. ............ 345/688 |
| 6,466,198 B1 | 10/2002 | Feinstein | |
| 6,570,567 B1 * | 5/2003 | Eaton ............................ 345/428 |
| 6,573,883 B1 | 6/2003 | Bartlett | |
| 7,036,086 B2 | 4/2006 | Cobbley et al. | |
| 7,467,356 B2 * | 12/2008 | Gettman et al. ............. 715/850 |
| 2002/0190947 A1 * | 12/2002 | Feinstein ...................... 345/158 |
| 2003/0201972 A1 * | 10/2003 | Usuda .................. G06F 1/1626 |
| | | | 345/156 |

(Continued)

FOREIGN PATENT DOCUMENTS

| | | | |
|---|---|---|---|
| KR | 10 2007 0004466 A | 1/2007 |
| KR | 10 2007 0065590 A | 6/2007 |
| WO | WO-2005/093550 A2 | 10/2005 |

*Primary Examiner* — Kieu Vu
*Assistant Examiner* — Anita D Chaudhuri
(74) *Attorney, Agent, or Firm* — Birch, Stewart, Kolasch & Birch, LLP

(57) ABSTRACT

A mobile device and a method for controlling a user interface of the mobile device are disclosed. According to an embodiment, the method includes detecting a movement of the mobile device as applied by a user's gesture, scrolling at least one of a page displayed on the display and a selection point on the display according to the detected movement of the mobile device, determining whether a selectable item displayed within the page is positioned on the selection point of the display, and selecting the selectable item in response to a predetermined event, once the determining step determines that the selectable item is positioned on the selection point of the display.

22 Claims, 14 Drawing Sheets

(56) References Cited

U.S. PATENT DOCUMENTS

| | | | |
|---|---|---|---|
| 2004/0201576 A1* | 10/2004 | Shimada | G06F 3/018 345/173 |
| 2005/0012723 A1* | 1/2005 | Pallakoff | 345/173 |
| 2006/0033724 A1 | 2/2006 | Chaudhri et al. | |
| 2006/0075357 A1* | 4/2006 | Guido et al. | 715/784 |
| 2006/0164382 A1 | 7/2006 | Kulas et al. | |
| 2007/0038952 A1* | 2/2007 | Reponen et al. | 715/783 |
| 2008/0005703 A1* | 1/2008 | Radivojevic et al. | 715/863 |
| 2008/0082934 A1* | 4/2008 | Kocienda et al. | 715/773 |
| 2008/0094369 A1* | 4/2008 | Ganatra et al. | 345/173 |
| 2008/0115046 A1* | 5/2008 | Yamaguchi | G06F 17/214 715/201 |
| 2008/0174547 A1* | 7/2008 | Kanevsky et al. | 345/156 |
| 2008/0174564 A1* | 7/2008 | Kim et al. | 345/173 |
| 2008/0228429 A1* | 9/2008 | Huang et al. | 702/141 |
| 2008/0244460 A1* | 10/2008 | Louch | 715/856 |

\* cited by examiner

METHOD AND DEVICE FOR CONTROLLING USER INTERFACE BASED ON USER'S GESTURE

CROSS-REFERENCE TO RELATED APPLICATIONS

The present application claims priority under 35 U.S.C. 119 to Korean Patent Application No. 10-2008-0035556 filed on Apr. 17, 2008 and Korean Patent Application No. 10-2008-0068312 filed on Jul. 14, 2008, which are hereby incorporated by reference in its entirety.

BACKGROUND

Field of the Invention

The present invention relates to a method for controlling a user interface, and more particularly to a mobile device and a computer program and method for controlling a user interface of a mobile device by detecting a user's gesture applied to the mobile device.

Description of the Related Art

There exist many kinds of mobile devices such as a mobile phone, an MP3 player, a PMP (portable multimedia player), a computer notebook, a PDA etc. These devices have limited user interfaces for users to input or output data due to the feature of portability. These mobile devices are usually not used in a fixed place but used while the user is moving with the devices. Also, the size of the mobile device is relatively small.

As such, it is improper to employ general I/O devices in these mobile devices which are devised for fixed devices such as a QWERTY key board, a mouse or a remote control which is devised for a desktop computer, large size TV, etc.

As such, different kinds of user interfaces were devised and widely used for the mobile devices such as a touch pad, a touch screen, a navigation pad, etc.

Nevertheless, the mobile devices are often still limited for users to input and output data and users feel that they can be more user-friendly and convenient to use.

Moreover, in case of mobile phones, tendency is toward adding many kinds of annexed functions to mobile phones such as an MP3 player, a camera, an internet browser, an image viewer, a video player, etc.

Mobile device users often need to use a keyboard especially when the user is browsing an internet webpage through the mobile device to input keywords for a search or password.

In case of a mobile device which substitutes a touch screen for physical buttons such as a full touch screen phone which has a large screen and does not have physical number buttons, if the user needs to input text, he needs to go through a few or more steps by manipulating the menu to have the virtual number buttons show up.

This causes much convenience to the users of the mobile devices. Advanced user interfaces for providing users with easy access to control mobile devices are required.

SUMMARY OF THE INVENTION

Accordingly, the present invention is to provide various mobile devices, and computer software and various methods for controlling a user interface of the mobile device.

The present invention is to provide a user interface which enables the user to input directions and data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided according to an embodiment a method for controlling a user interface comprising: detecting a user's gesture applied to a mobile device; scrolling a display over a page displayed on the mobile device according to the detected gesture; detecting that a selectable item on the page is positioned on a selection point of the display of the mobile device; and activating a user interface.

In another aspect of the present invention, there is provided a method of controlling a user interface comprising: detecting a user's gesture applied to a mobile device; scrolling a display over a page displayed on the mobile device according to the detected gesture; detecting that at least a part of an input area of the display is overlapped with at least a part of the input window of the page; and activating a user interface.

In another aspect of the present invention, there is provided a method for controlling a user interface comprising: detecting a user's gesture applied to a mobile device; scrolling a display of the mobile device over a page displayed on the mobile device; and displaying a guide window including a miniature of the page.

In another aspect of the present invention, there is provided a method for controlling a user interface of a mobile device, comprising: detecting a user's gesture applied to the mobile device; scrolling a display over a page displayed on the mobile device according to the detected gesture; detecting that a selectable item on the page is positioned on a selection point of the display of the mobile device; detecting a user's gesture for execution; and executing the selectable item.

In another aspect of the present invention, there is provided a method for controlling a user interface of a mobile device, comprising: detecting a user's gesture applied to the mobile device; moving a selection point on a display of the mobile device according to the detected gesture; detecting that the selection point on the display is positioned on a selection item of on a displayed page of the mobile device; detecting a user's gesture for execution; and executing the selectable item.

In another aspect of the present invention, there is provided a method for controlling a user interface of a mobile device including a display, the method comprising: detecting a movement of the mobile device as applied by a user's gesture; scrolling at least one of a page displayed on the display and a selection point on the display according to the detected movement of the mobile device; determining whether a selectable item displayed within the page is positioned on the selection point of the display; and selecting the selectable item in response to a predetermined event, once the determining step determines that the selectable item is positioned on the selection point of the display.

In another aspect of the present invention, there is provided a method of controlling a user interface of a mobile device, the method comprising: detecting a movement of the mobile device as applied by a user's gesture; scrolling a page displayed on a display of the mobile device according to the detected movement of the mobile device; determining when at least a part of an input area of the display is in contact with or overlapping an input window of the page displayed on the display; and activating a user interface based on the determination result.

In another aspect of the present invention, there is provided a method for controlling a display of a mobile device, the method comprising: detecting a movement of the mobile device as applied by a user's gesture; scrolling a page on the display according to the movement of the mobile device; and displaying, on the display, a guide window in addition to the page currently displayed on the display, the guide window including a miniature of the page currently displayed on the display.

In another aspect of the present invention, there is provided a mobile device comprising: a display; a detector configured to detect a movement of the mobile device as applied by a user's gesture; and a controller, by controlling the display, configured to scroll at least one of a page displayed on the display and a selection point on the display according to the detected movement of the mobile device; to determine whether a selectable item displayed within the page is positioned on the selection point of the display; and to select the selectable item in response to a predetermined event, once the controller determines that the selectable item is positioned on the selection point of the display.

In another aspect of the present invention, there is provided a mobile device comprising: a display; a user interface; a detector configured to detect a movement of the mobile device as applied by a user's gesture; and a controller, by controlling the display, configured to scroll a page displayed on the display according to the detected movement of the mobile device; to determine when at least a part of an input area of the display is in contact with or overlapping an input window of the page displayed on the display; and to activate the user interface based on this determination result.

In another aspect of the present invention, there is provided a mobile device comprising: a display; a detector configured to detect a movement of the mobile device as applied by a user's gesture; and a controller, by controlling the display, configured to scroll a page on the display according to the movement of the mobile device; and to display, on the display, a guide window in addition to the page currently displayed on the display, the guide window including a miniature of the page currently displayed on the display.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1A:
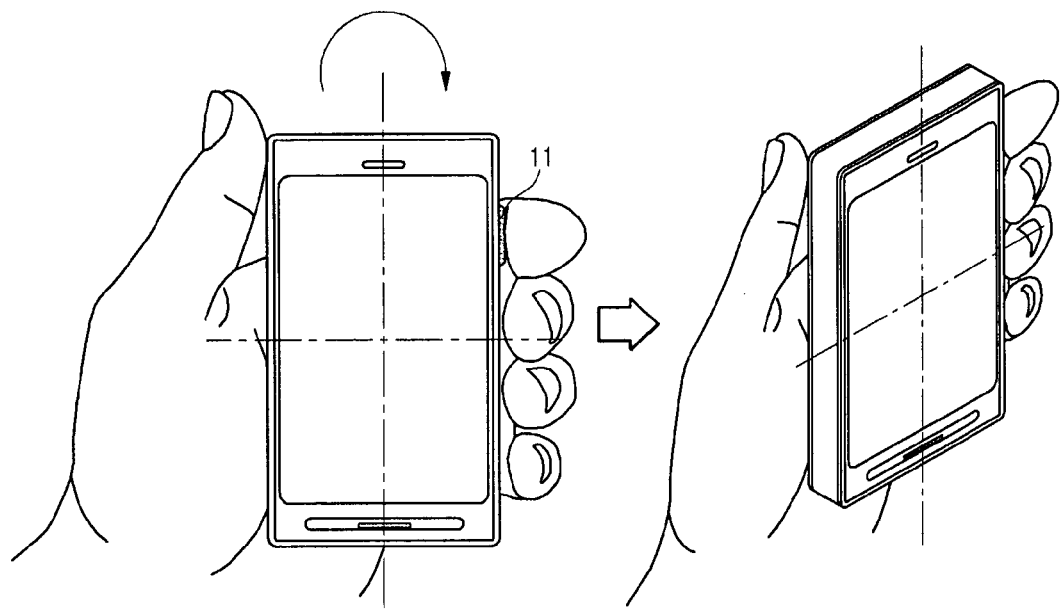
FIGS. 1A and 1B show an embodiment of a controlling method for a user interface of a mobile device using a gesture according to the present invention.
Figure 1B:
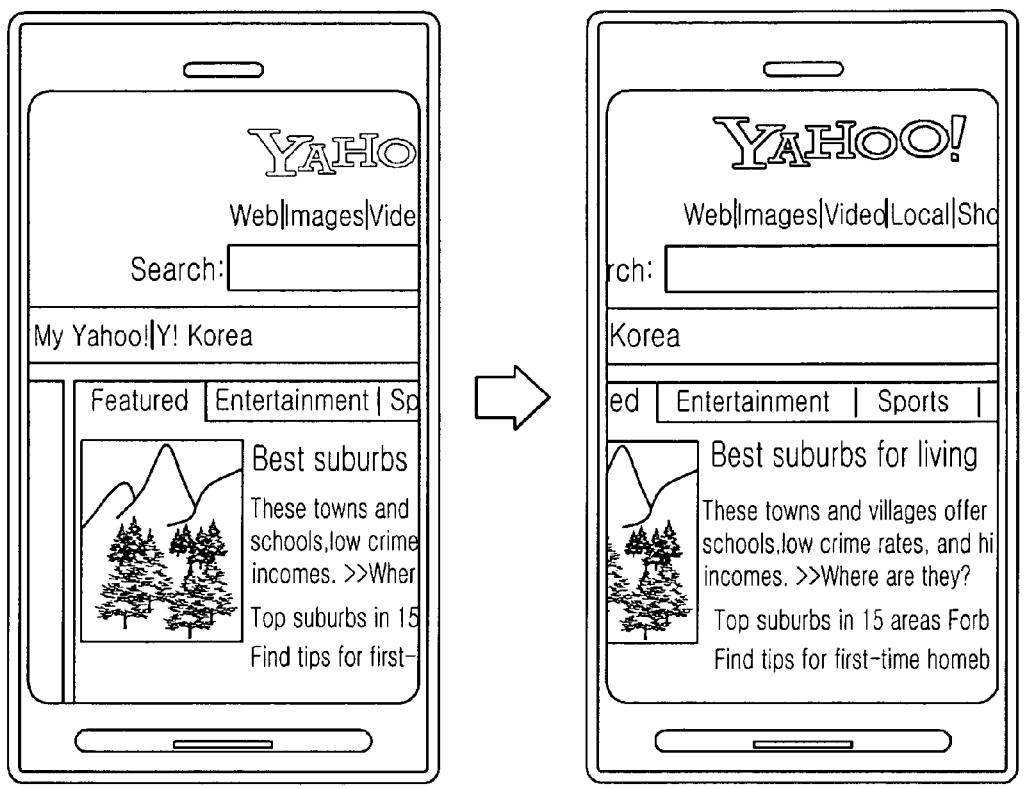

FIG. 1A and FIG. 1B show a user interface controlling method using a gesture according to an embodiment of the present invention.

A mobile device according to the present invention may be equipped with an inertia sensor such as a gyro sensor, a tilt sensor, an acceleration sensor, etc. Examples of the mobile device according to the present invention include a mobile phone, an MP3 player, a PMP (Portable Multimedia Player), a computer notebook, a PDA, a smart phone, etc.

In the following detailed description, the embodiments of the present invention are described assuming a case where the mobile device is a mobile phone. However, it should be clearly understood that the present invention is not limited thereto, and covers various types of mobile devices or portable electronic devices.

The mobile phone in the accompanying drawings is a so-called "full touch screen phone" which has no physical number buttons on the front surface of the mobile phone and the display covers most of the front surface.

As shown in FIG. 1A, if user applies a gesture to the mobile device such as a mobile phone, the inertia sensor in the mobile phone may sense the gesture of a user as the user applies it to the mobile phone. A controller inside the mobile phone directs the mobile device/phone to perform a certain function corresponding to the applied gesture.

For example, assuming a user is browsing an internet webpage through wired or wireless connections using the mobile phone, if the user tilts the mobile phone, the inertia sensor detects the motion caused by the tilting gesture. For instance, if the user tilts the mobile phone toward the right side, the controller of the mobile phone may cause scrolling of the display over the webpage currently being viewed according to the detected motion. The user can tilt the mobile phone in various directions and angles, which according to the present invention causes the scrolling of the page (e.g., webpage or Word document page, etc.) on the display of the mobile phone to occur, according to the tilting directions and/or angles. In these cases, the direction of the page scrolling may correspond with the direction in which the mobile device is tilted by the user, and the amount of the page scrolling (e.g., speed of scrolling or number of pages being scrolled) may correspond with the angle at which the mobile device is tilted by the user. In other examples, the user may tilt the mobile device once (e.g., by flicking the mobile device back and forth once), then the page may be scrolled to a next page so that the page-to-page scrolling may occur according to the number of times the mobile device is flicked. In another example, the user may tilt the mobile device in a certain direction and hold it there for a predetermined time duration. In that case, the distance of scrolling may be proportional to the predetermined time duration. In another example, a certain action (e.g., flick twice quickly) may cause the continuous scrolling of the page to occur automatically. In all these examples, the flicking/tilting directions may control the scrolling directions as discussed above. Further, the tilting directions of the invention include any and all directions (e.g., slant angle directions, diagonal directions, etc.) and are not limited to the right, left, up and down directions.

The left picture of FIG. 1B shows a part of a webpage being browsed and the right picture shows the webpage scrolled to the right. As shown in FIG. 1A, if the user tilts the mobile phone to the right, the inertia sensor may detect this gesture and may scroll the display over the webpage to the right according to the gesture detection.

Similarly, if the user tilts the mobile phone to the left, the inertia sensor may detect this gesture and may scroll the display over the webpage to the left according to this gesture detection.

The operation mode where the inertia sensor detects the user's gesture as applied to the mobile device and the controller of the mobile device directs the mobile phone/device responsive to the detection (hereinafter referred to as "gesturing mode" may be activated or deactivated by the user's selection). That is, the gesturing mode of the mobile device is a mode in which the mobile device operates and controls the user interface according to various gestures applied to the mobile device by the user, as discussed herein according to the present invention.

In an example, in FIG. 1A, the mobile phone may be equipped with an activation button 11 on a side of a mobile device, and the gesturing mode may be activated only when the activation button 11 is pushed or is pushed down for a predetermined time duration.

The scheme to activate the gesturing mode may be varied. For example, in one embodiment, without a physical button 11, the user may manipulate software for a menu control embedded in the mobile phone to activate the gesturing mode.

In one embodiment, it may be configured that the gesturing mode is activated when a specific gesture is applied. For example, the gesturing mode may be activated when the user quickly shakes the mobile phone. The inertia sensor may detect the shaking gesture and forward the gesture detection to the controller in the mobile phone which directs the mobile phone to enter the gesturing mode. Also, it may be configured that the user may escape from the gesturing mode when the user quickly shakes the mobile phone again in the gesturing mode. In a non-gesturing mode, the mobile phone is not responsive to the user's gesture applied to the mobile device.

In one embodiment, it may be configured that the mobile phone enters the gesturing mode when the mobile phone is tilted at a specific angel for a predetermined certain time. That is, if the user grabs and holds the mobile phone at a certain angle and for 3 seconds, the inertia sensor detects this gesture and the mobile phone may enter the gesturing mode.

The display of a mobile device such as a mobile phone is often configured to be deactivated as the power to the display is cut off for power saving if the mobile phone is not in use for a certain time. In one embodiment of the present invention, the gesturing mode of the mobile phone may be deactivated when the display is deactivated, to save power and other resources. When the mobile phone is not in use for a long time, the gesturing mode would not be needed either.

Figure 2A:
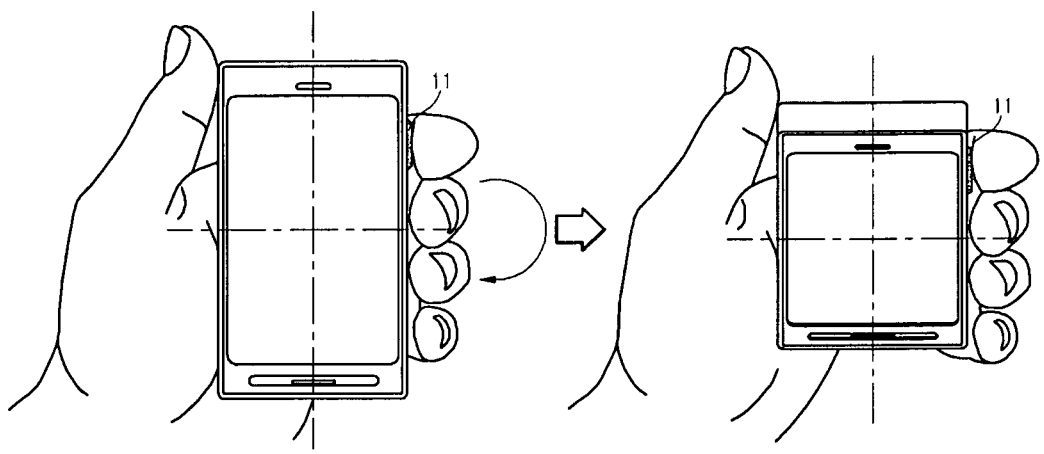
FIGS. 2A and 2B show another embodiment of a controlling method for a user interface of a mobile device using a gesture according to the present invention.
Figure 2B:
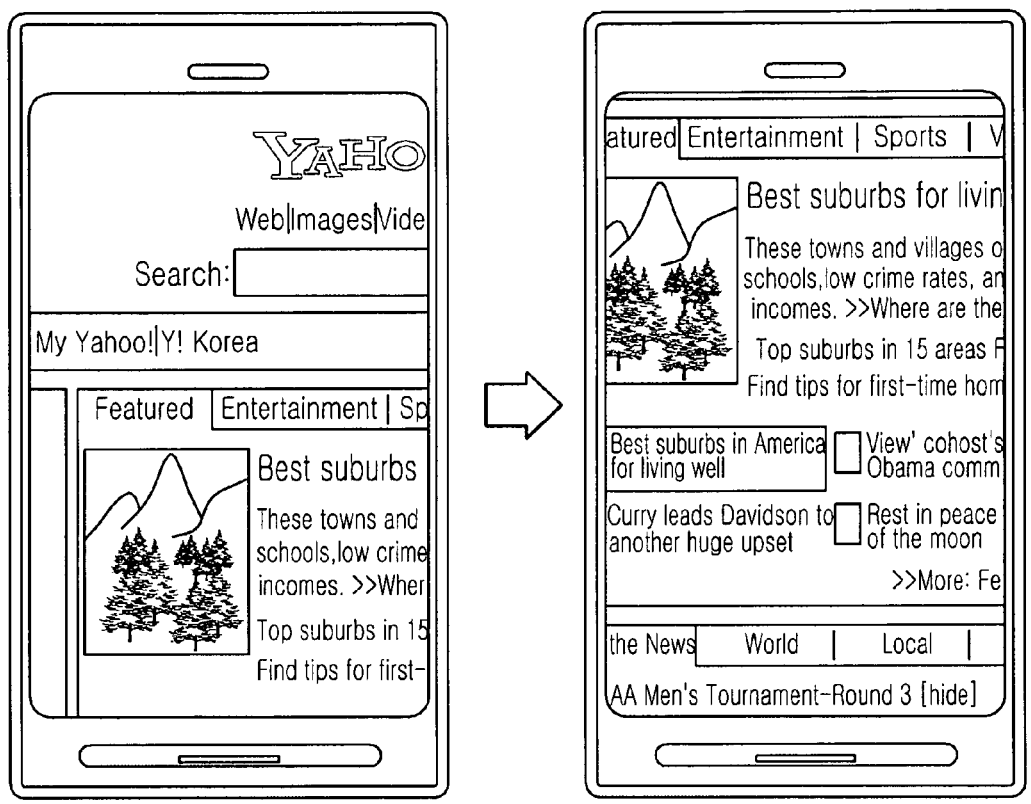

In a non-limiting example, as shown in FIG. 2A, if the user holds up the phone and tilts the mobile phone down so that the top/upper part of the mobile phone gets closer to the user with holding the activation button 11 (tilting the phone in the upward direction with respect to the horizontal axis), the display of the mobile phone may be scrolled down to the webpage as shown in FIG. 2B. If the user tilts the mobile phone up so that the phone turns up, the display of the mobile phone may be scrolled up toward the top of the webpage being browsed.

In one embodiment, it may be configured that whenever the user tilts the mobile phone more than a predetermined angel, the display may be scrolled by a predetermined distance. In this case, it only matters whether the tilted angle is beyond the predetermined angel or not. If the user wants to scroll a long distance, he needs to tilt the mobile phone several times. Alternatively, the display may be scrolled by a distance in proportion to the tilted angle.

The scroll direction according to the tilted direction may be varied. For example, opposite to the above cases, if the mobile phone is tilted to the tight, the display may be scrolled to the left; if the mobile device is tiled to the left, the display is scrolled to the right; if the mobile device is tilted toward the top, the display is scrolled down; and if the mobile device is tilted down, the display is scrolled to the top of the display.

Conventionally, mobile devices such mobile phones are not equipped with QWERTY keyboard or mouse as in PC. Accordingly, when the user browses the internet web pages, stylus pen or finger is used instead of a mouse to click or double click the selectable items such as hyperlinks or to push various virtual buttons on the web pages.

Also, conventionally, when the user needs to type in characters such as ID or password, he needs to move the cursor on the input window before typing in the characters. In case of the mobile device which has a touch screen, the user needs to enable the virtual text input panel or switch to a note recognition mode to input characters.

Figure 3A:
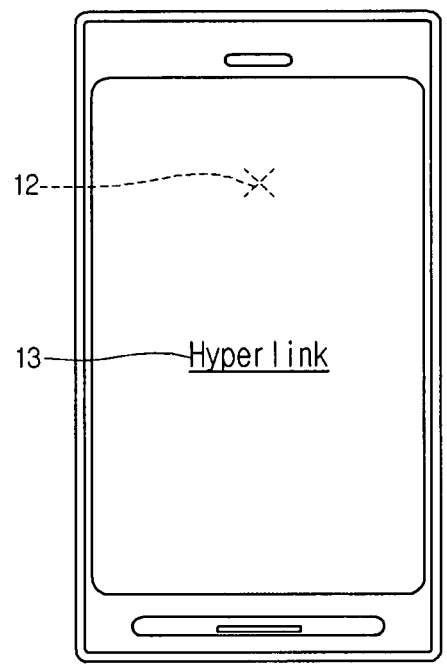
FIGS. 3A and 3B show an embodiment of a method for selecting a selectable item on the display according to the present invention.
Figure 3B:
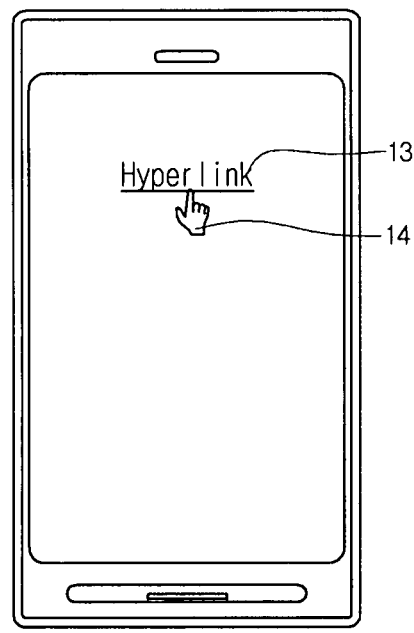

FIGS. 3A and 3B show an embodiment of a method for selecting selectable items on a display of a mobile device according to the present invention.

Assume the user is browsing the internet web page on the mobile device, and a hyperlink 13 is positioned on the display as shown in FIG. 3A. A certain position on the display may be preset as a selection point 12. Preferably, the selection point 12 is positioned in the middle of the display, but can set at any desired position, which may be set or changed by the user or the mobile device. Preferably the selection point is fixed on the display and does not change even if the web page is scrolled. The selection point 12 may be invisible to the user or may be marked with a certain symbol or color so that it is visible to the user. In another example, the selection point 12 can be a selection area.

In the state as shown in FIG. 3A, if the user tilts the mobile phone downward (that is, the top of the mobile phone is turned toward the user) as shown in FIG. 2A, the web page displayed on the display of the mobile phone is scrolled so that the hyperlink 13 of the web page is positioned on the selection point 12. When the hyperlink 13 of the web page is positioned on the selection point 12, the user can execute the hyperlink by clicking the hyperlink 13 with his finger or stylus pen. An indicator 14 may be displayed to inform the user the hyperlink 13 is available to select. Executing the hyperlink can include, accessing the hyperlink website and displaying it on the display, performing a predetermined operation associated with the hyperlink, etc.

In one embodiment, the hyperlink may be executed when the hyperlink 13 stays on the selection point 12 for a predetermined time, for example two seconds without any input from the user. In another example, when the hyperlink 13 is on the selection point 12, if the user shakes or flicks the mobile device, then the hyperlink 13 may be executed. In another example, the scrolling of the page may stop automatically when the hyperlink 13 comes over the selection point 12. Then the user can shake, push a button, or perform a preset action to execute the hyperlink 13.

Alternatively, a virtual button may be displayed in a part of the display when the hyperlink 13 is positioned on the selection point 12. The hyperlink may be executed when the user touches the virtual button.

The above embodiment may be applied to selecting any virtual buttons other than hyperlinks provided on the web pages when the user is browsing the internet web page. For example, the above embodiment may be applied to a case where a video playing panel is displayed and the user needs to select the virtual buttons to manipulate the video file such as playback, pause, stop, etc.

Figure 4A:
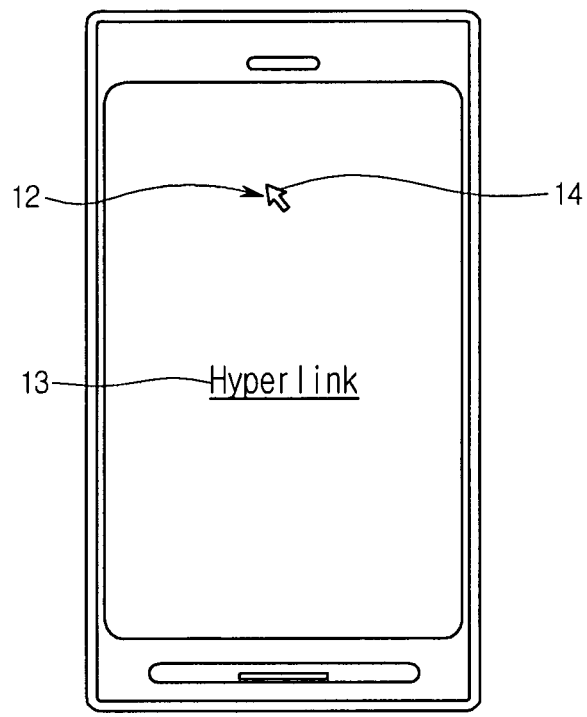
FIGS. 4A and 4B show an embodiment of a method for selecting a selectable item on the display according to the present invention.
Figure 4B:
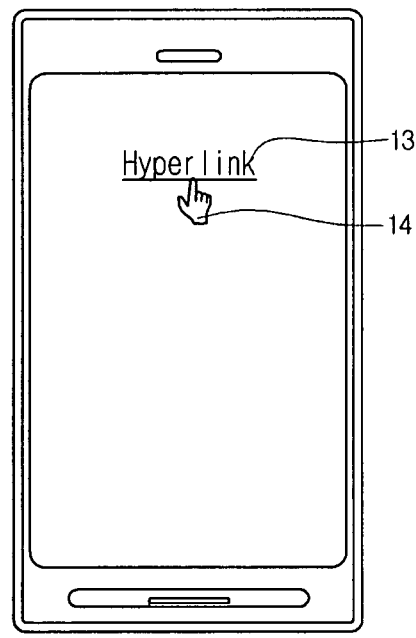

In one embodiment, an indicator 14 may be displayed on the selection point 12 as shown in FIG. 4A. When the display of the mobile phone is scrolled and the hyperlink 13 is positioned on the selection point 12, it may be configured to inform the user the hyperlink 13 is available to select by changing the indicator 14 to another shape of indicator 14 as shown in FIG. 4B. The hyperlink 13 may be executed by the user touching on the display or pushing a physical button on the mobile phone or in other way as discussed above.

Figure 5:
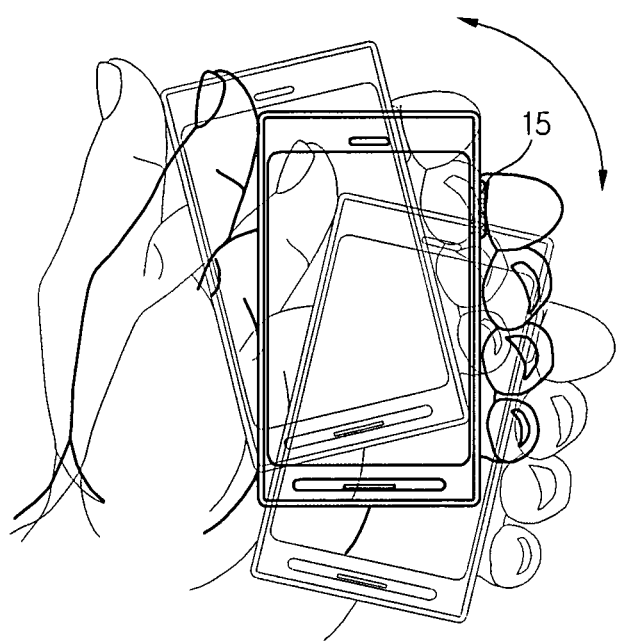
FIG. 5 shows a gesture of shaking the mobile phone according to an embodiment of the present invention.

In one embodiment of the present invention, while the indicator 14 is displayed as shown in FIG. 4B, it may be configured that if the user shakes the mobile device as shown in FIG. 5, the hyperlink upon which the indicator 14 is positioned is executed by detecting the user's gesture of shaking. The gesture of shaking may be effective to execute the hyperlink only while the user pushes an activation button 15 or other physical button on the mobile device.

The gesture of shaking the mobile device may also be used to click a virtual button displayed on the mobile device.

In one embodiment of the present invention, if the user tilts the mobile device while pushing and holding down on the activation button 15 or other physical button on the mobile device, the selection point 12 itself may be moved on the display with the displayed page being fixed and not moved on the display.

Figure 6A:
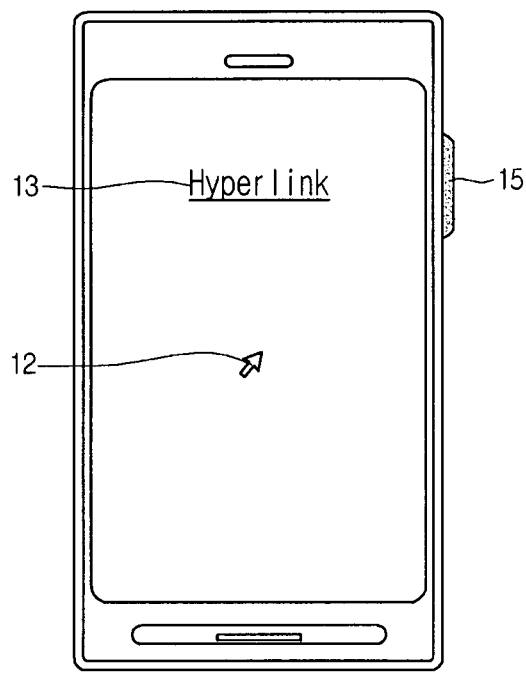
FIGS. 6A and 6B show another embodiment of a method for selecting a selectable item on the display according to the present invention.
Figure 6B:
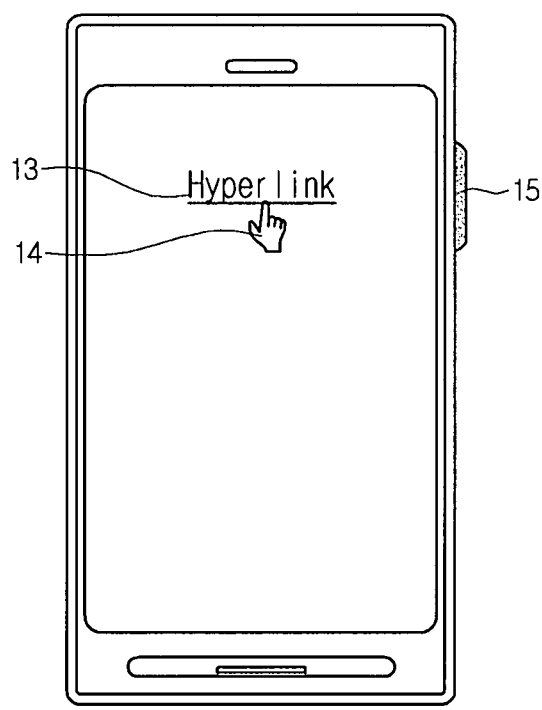

That is, as a web page is displayed on the display of the mobile device as shown in FIG. 6A, if the user tilts the mobile device while pushing and holding down on the activation button 15, the displayed web page is not scrolled (and the web page is fixedly displayed) but the selection point 12 may move on the display. When the user moves the selection point 12 (e.g., by tilting the mobile device while the activation button 15 is pressed down) and puts the selection point 12 on the hyperlink 13, the selection point 12 may be changed to an indicator 14 and become executable as shown in FIG. 6B. While the indicator 14 is displayed, the hyperlink 13 may be executed by clicking or touching the hyperlink 13 or by pushing a physical button on the mobile device or in some other way as discussed above. Here, the user can move the selection point 12 in any direction on the display.

In another example, without pressing the button 15, the user scrolls the pages by tilting the mobile device as discussed above. Then the user can press down on the button 15 and tilt the mobile device, to move the selection point in any direction (e.g., diagonally, up, down, right, left, etc.).

In one embodiment of the present invention, if the user shakes the mobile device as shown in FIG. 5 while the indicator 14 is displayed, a motion sensor of the mobile device may detect the gesture of shaking of mobile device and the hyperlink may be executed upon detecting this gesture. The execution of hyperlink may be effectively triggered only when the activation button 15 is pushed or when other physical button is pushed.

In other aspects, the user often needs to type in characters when browsing the internet web pages other than to execute the hyperlink or click the virtual button so as to input key words for a search or ID and password for login. User interface for typing in various characters is required in a full touch screen phone, PDA or a normal mobile phone which has the number buttons not a QWERTY keyboard especially when the user is browsing the internet web page.

In one embodiment of the present invention, the user can be provided with a user interface for typing in characters, symbols, etc.

Figure 7A:
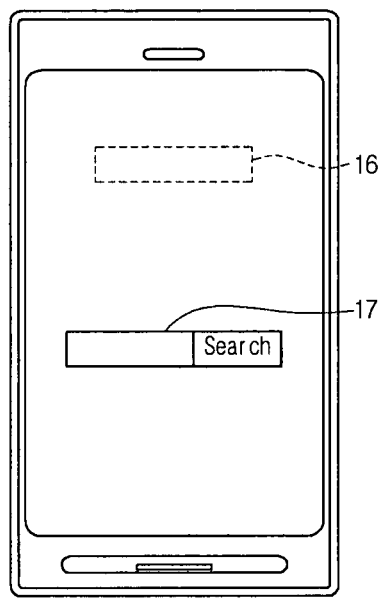
FIGS. 7A and 7B show an example of a method for providing an input menu according to an embodiment of the present invention.

As shown in FIG. 7A, a predetermined area of the display on the mobile phone/device may be set as an input area 16. The input area 16 may be in the same shape of a rectangle as the input windows in the conventional internet web pages, or may be in other shape. The input area 16 may be invisible to the user or be visible to the user by being visualized with dot lines or inconspicuous lines or in some other manner. In one example, the input area 16 may be visualized by shadowing or in different color. A page (e.g., a webpage) displayed on the display of the mobile device may have an input window 17 for a user to input data and information.

Figure 7B:
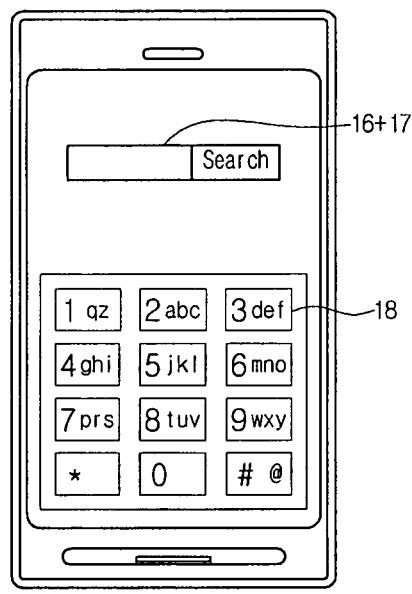

As shown in FIG. 7B, the input area 16 and the input window 17 of the web page may be matched from the state shown in FIG. 7A by tilting the mobile phone in various directions as shown in FIGS. 1A through 2B. In one example, the input area 16 is fixed on the display and is not moved. In this case, the user can tilt the mobile device to scroll/move the page in the tilting direction, which in turn moves the input window 17 included in the page. By controlling the tilting direction, then the user can move the input window 17 to be placed over (in part or in entirety) or in contact with the input area 16.

Then, when the input window 17 matches the input area 16 or is placed over at least in part or touches the input area 16, a user interface may be provided on the display. For example, when the input area 16 and the input window 17 of the web page are overlapped at least in part or are in contact with each other, a virtual keyboard 18 may be displayed as shown in FIG. 7B. The virtual keyboard 18 may be either of number buttons used in normal mobile phones or QWERTY keyboard or some other input unit.

When the virtual keyboard 18 is displayed, the focus of the web page is moved to the input window 17 and the user can input characters into the input window 17 through the virtual keyboard 18 by, e.g., touching the keys by a finger or stylus.

Characters may be inputted without using the virtual keyboard in an embodiment of the present invention. For example, in case of a mobile phone which does not have a touch screen, when the input area 16 and the input window 17 are overlapped, it is not needed to display the virtual keyboard 18 and only focus is moved to the input area 16. The user can input characters by pushing the physical buttons provided on the mobile phone.

Alternatively, a note recognition panel may be provided instead of the virtual keyboard 18 and the user can input characters through the note recognition panel.

In one embodiment of the present invention, when the input window of a web page being browsed on the mobile device is available to input characters, it may be displayed to the user together with visualizing the input area 16.

By selecting a button (virtual or physical button) or performing a certain action (e.g., tilting the mobile device, shaking the mobile device at least once, touching an area of the display in a certain manner, etc.) on the mobile device, the user may cause the displayed virtual keyboard to disappear or the displayed page to go back to a previous page.

Figure 8A:
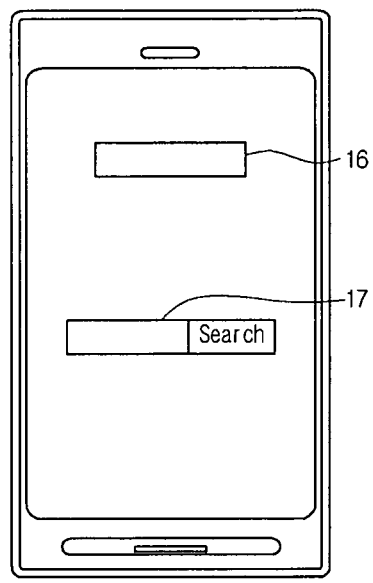
FIGS. 8A and 8B show an example of a method for provided an input menu according to another embodiment of the present invention.
Figure 8B:
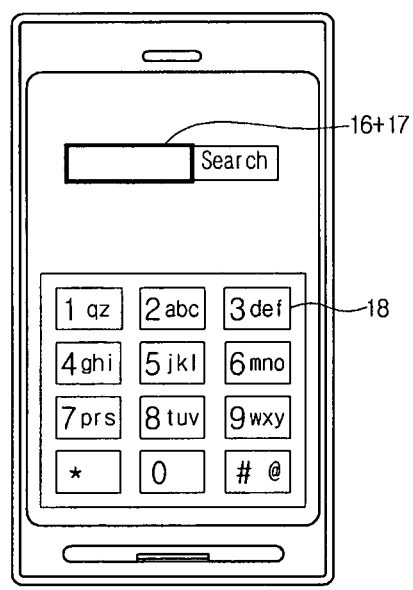

In a state shown in FIG. 8A, the user may apply gestures to the mobile phone to overlap at least in part (or in touch) the input area 16 with the input window 17 as discussed above. A virtual key pad 18 may be displayed as shown in FIG. 8B when the input area 16 and the input window 17 are overlapped.

In one embodiment, the lines 16+17 where the input area 16 and the input window 17 are overlapped may be made conspicuous by increasing the brightness of the lines of changing the color of lines. As such, the user may easily recognize that it is in a character-input mode where he can input characters.

Figure 9:
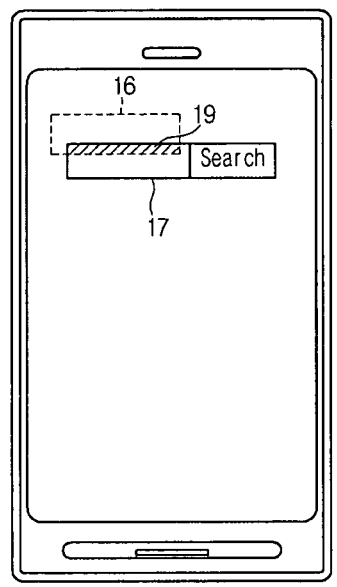
FIG. 9 shows an example of a method for determining whether to activate a user interface according to an embodiment of the present invention.

In FIGS. 7A-8B, the sizes of the input area 16 and input window 17 may be different. In this case, the input area 16 and the input window 17 cannot be exactly matched. The virtual keyboard panel (e.g., 18) may be configured to be displayed when any part of the input area 16 is overlapped with the input window 17 or conversely any part of the input window 17 is overlapped with the input area 16 as shown in FIG. 9.

In one embodiment, the virtual keyboard panel may be displayed when the overlapped area of the input area and the input window is beyond a predetermined area.

In one embodiment, the virtual keyboard panel may be displayed when an edge of the input area 16 is overlapped with an edge of the input window 17 or when two edges of the input area 16 are overlapped with the edges of the input window 17.

In one embodiment, the input area 16 may be set as relatively small and the virtual keyboard panel may be displayed when the input area 16 is included in the input window 17.

In one embodiment of the present invention, when the input area 16 and the input window 17 are matched or overlapped, a note recognition panel may be displayed instead of the virtual keyboard panel. The moment the note recognition panel is displayed, the note recognition mode may be locked by a predetermined input from the user to maintain the note recognition panel. When the note recognition mode is locked, the note recognition panel is maintained without overlapping between the input area 16 and the input window 17 anymore.

The predetermined input from the user may be either a physical button on the surface of the mobile phone or a virtual button displayed on the mobile phone.

Alternatively, the virtual keyboard or the note recognition panel may be displayed and locked when the input area 16 and the input window 17 are kept overlapped for more than a predetermined time, for example, 2 seconds. That is, when the input area 16 and the input window 17 are overlapped and the state is kept for a predetermined time, the virtual keyboard or the note recognition panel may be kept being displayed despite moving or tilting of the mobile phone.

In the examples of FIGS. 7A-9, the input area 16 is preset and fixedly displayed and does not move while the input window 17 may be moved by moving the mobile device. Here, the user may vary the preset location of the input area 16 by controlling menus. In another example, similar to the example of FIGS. 6A and 6B, the input area 16 may be moved by the user as the user tilts the mobile device, while the input window 17 is fixedly displayed.

Figure 10:
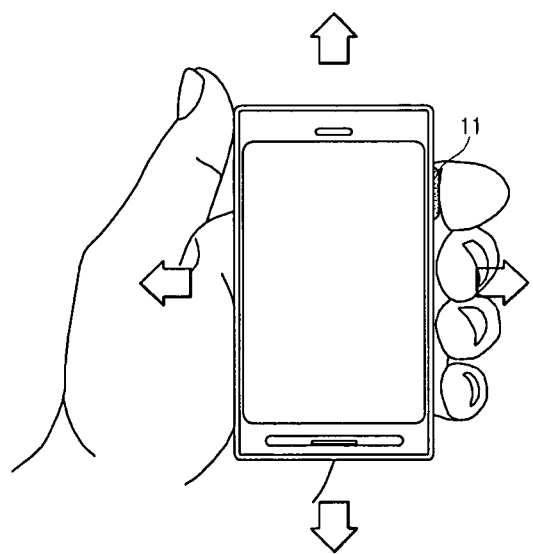
FIG. 10 shows an example of a user's gesture according to an embodiment of the present invention.

In one embodiment of the present invention, a mobile device may be equipped with an inertia sensor and the display of the mobile device may be scrolled by detecting the motion of the mobile device with an activation key 11 pushed as shown in FIG. 10. A user interface may be activated when a selection point is positioned on a selectable item or an input area is matched or overlapped with an input window. The user may select an item or input data through the user interface.

In one embodiment, a guide on the display of the mobile device may be provided which is used to locate the part currently being viewed in the whole page such a case as browsing the internet web page.

Figure 11:
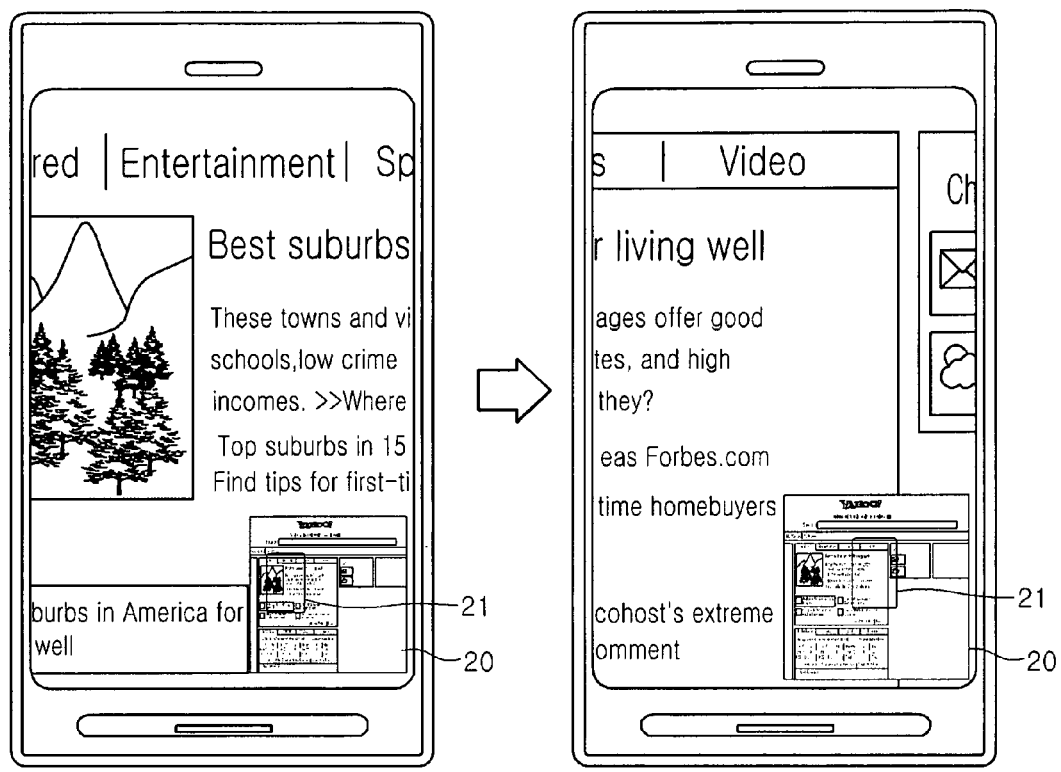
FIG. 11 shows a user interface controlling method of a mobile device according to an embodiment of the present invention.

For example, as shown in FIG. 11, a guide window 20 may be displayed on a part of the display. The guide window 20 comprises a miniature of the whole web page, in which a location indicator 21 may be displayed. The location indicator 21 indicates the location of the part currently being viewed on the display.

The location indicator 21 moves as the web page is scrolled through the user's gestures as discussed above in various embodiments. The user may recognize where the part currently being shown is located on the display, from the location indicator 21.

In one embodiment, as the web page is zoomed in or out, the location indicator 21 may be zoomed in or out accordingly.

In one embodiment, the selection point 12 or input area 16 may be included in the location indicator 21. As such, the user may select a selectable item or scroll the web page by looking at only the guide window 20.

According to the present invention, the hyperlink 13 and the input window 17 are examples of selectable items. Other types of selectable items may be displayed on the display and selected by the user as the user tilts the mobile device, in the same or similar manner the hyperlink 13 is executed as discussed above. Other types of selectable items may be one or more buttons associated with controlling a playing/recording of a motion picture or audio data. etc. Further, the movement of the mobile device as applied by the user, which controls the user interface as discussed according to the embodiments of the present invention, can include at least one of rolling (e.g., rotating right and left), pitching (e.g., rotating front and back), yawing/heading/pivoting (e.g., right and left or front and back pivoted movement) and transition (e.g., lateral movement). Further, scrolling of a page as discussed above can include a page-to-page flipping and an in/out zooming operation according to the present invention.

Various embodiments and examples of methods and operations of the present invention discussed above are implemented in a mobile device or portable electronic device. An example of such a device as a mobile device 100 is discussed below referring to FIGS. 12 and 13. A controller 180 of the mobile device 100 may be configured to control a display 151 (which may be a touch screen) to perform the various user interface controlling methods of the present invention. The mobile device of the present invention may have all or part of the components of the mobile device 100.

Figure 12:
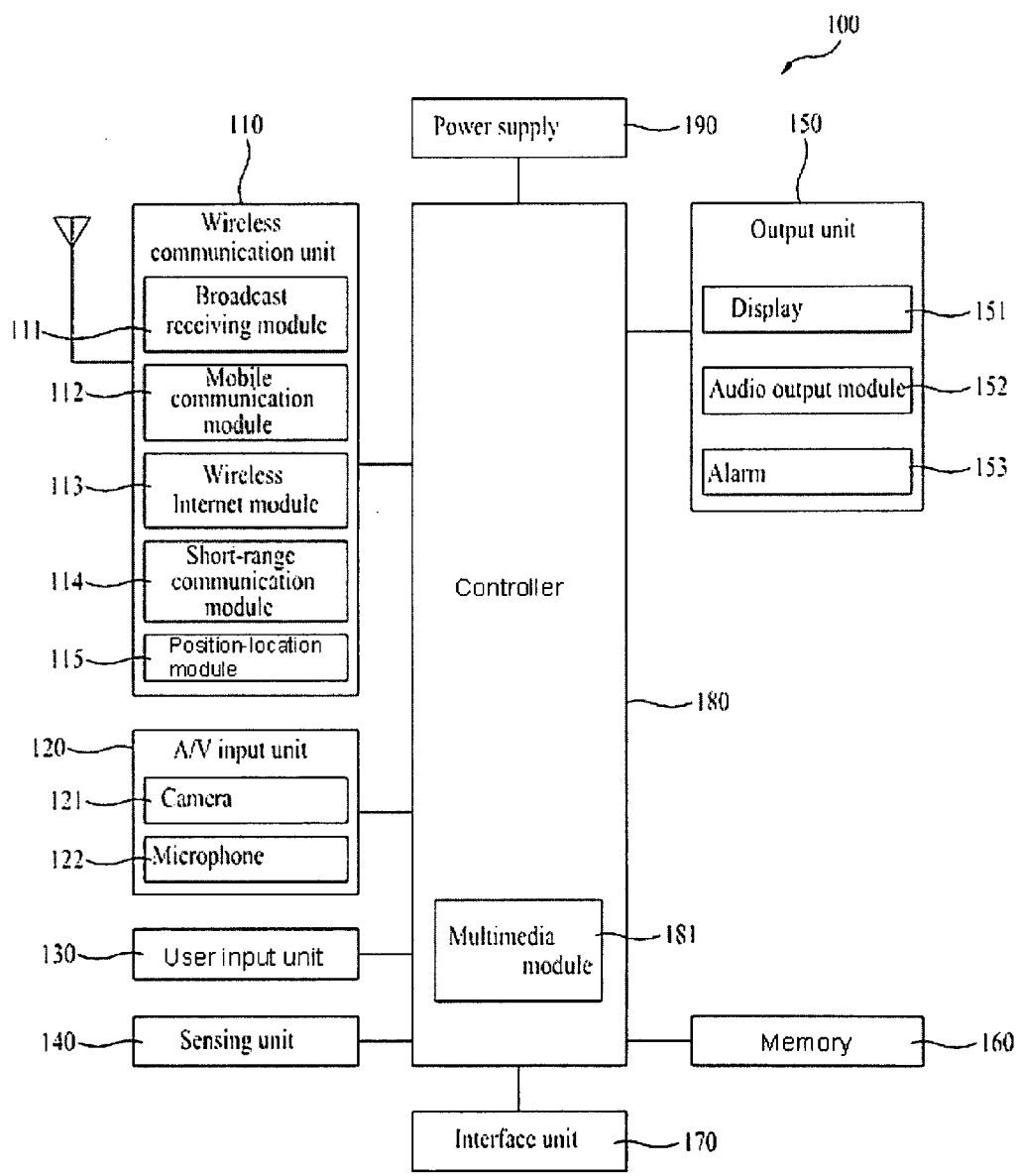
FIG. 12 is a block diagram of a mobile device in accordance with an embodiment of the present invention.

FIG. 12 is a block diagram of the mobile device 100 in accordance with an embodiment of the present invention. The mobile device may be implemented using a variety of different types of devices. Examples of such devices include mobile phones, user equipment, smart phones, computers, digital broadcast devices, personal digital assistants, portable multimedia players (PMP) and navigators. By way of non-limiting example only, further description will be with regard to a mobile device. However, such teachings apply equally to other types of devices. FIG. 12 shows the mobile device 100 having various components, but it is understood that implementing all of the illustrated components is not a requirement. Greater or fewer components may alternatively be implemented.

FIG. 12 shows a wireless communication unit 110 configured with several commonly implemented components. For instance, the wireless communication unit 110 typically includes one or more components which permits wireless communication between the mobile device 100 and a wireless communication system or network within which the mobile device is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile device. This module may be internally or externally coupled to the device.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile device. If desired, this module may be implemented using global positioning system (GPS) components which cooperate with associated satellites, network components, and combinations thereof.

Audio/video (AN) input unit 120 is configured to provide audio or video signal input to the mobile device. As shown, the AN input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a touch screen panel, a jog wheel and a jog switch.

The sensing unit 140 provides status measurements of various aspects of the mobile device. For instance, the sensing unit may detect an open/close status of the mobile device, relative positioning of components (e.g., a display and keypad) of the mobile device, a change of position of the mobile device or a component of the mobile device, a presence or absence of user contact with the mobile device, orientation or acceleration/deceleration of the mobile device.

The sensing unit 140 may comprise an inertia sensor for detecting movement or position of the mobile device such as a gyro sensor, an acceleration sensor etc. or a distance sensor for detecting or measuring the distance relationship between the user's body and the mobile device.

The interface unit 170 is often implemented to couple the mobile device with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile device. Display 151 is typically implemented to visually display information associated with the mobile device 100. For instance, if the mobile device is operating in a phone call mode, the display will generally provide a user interface or graphical user interface which includes information associated with placing, conducting, and terminating a phone call. As another example, if the mobile device 100 is in a video call mode or a photographing mode, the display 151 may additionally or alternatively display images which are associated with these modes.

A touch screen panel may be mounted upon the display 151. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile device may include one or more of such displays.

FIG. 12 further shows an output unit 150 having an audio output module 152 which supports the audio output requirements of the mobile device 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile device. Typical events include call received, message received and user input received. An example of such output includes the providing of tactile sensations (e.g., vibration) to a user. For instance, the alarm 153 may be configured to vibrate responsive to the mobile device receiving a call or message. As another example, vibration is provided by alarm 153 as a feedback responsive to receiving user input at the mobile device, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile device. Examples of such data include program instructions for applications operating on the mobile device, contact data, phonebook data, messages, pictures, video, etc. The memory 160 shown in FIG. 12 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile device. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments of the present invention described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

The mobile device 100 may be implemented in a variety of different configurations. Examples of such configurations include folder-type, slide-type, bar-type, rotational-type, swing-type and combinations thereof. For clarity, further disclosure will primarily relate to a slide-type mobile device. However such teachings apply equally to other types of devices.

The mobile device 100 of FIG. 12 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 13:
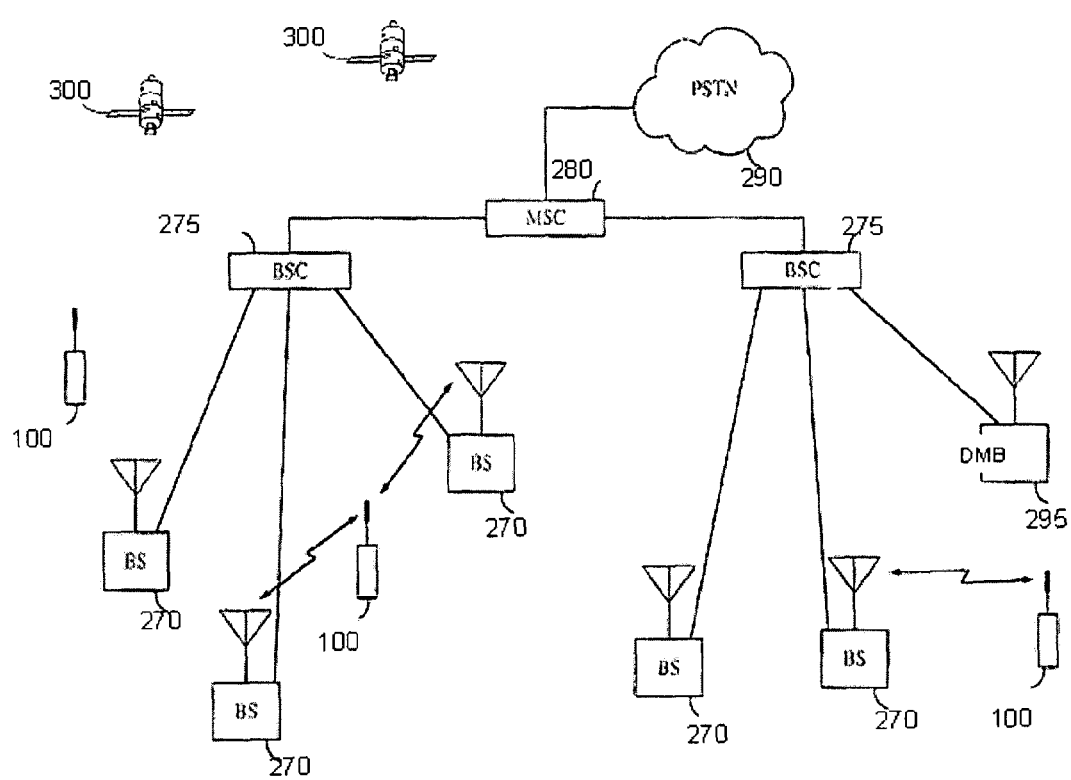
FIG. 13 is a block diagram of a CDMA wireless communication system operable with the mobile device of FIG. 12.

Referring now to FIG. 13, a CDMA wireless communication system is shown having a plurality of mobile devices 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable devices 100 operating within the system. The broadcast receiving module 111 (FIG. 12) of the portable device is typically configured to receive broadcast signals transmitted by the DMB transmitter 295. Similar arrangements may be implemented for other types of broadcast and multicast signaling (as discussed above).

FIG. 13 further depicts several global positioning system (GPS) satellites 300. Such satellites facilitate locating the position of some or all of the portable/mobile devices 100. Two satellites are depicted, but it is understood that useful positioning information may be obtained with greater or fewer satellites. The position-location module 115 (FIG. 12) of the portable device 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile devices 100. The mobile devices 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile devices 100.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. A method for controlling a user interface of a mobile device including a display, the method comprising:
   detecting a movement of the mobile device as applied by a user's gesture;
   scrolling a page displayed on the display according to the detected movement of the mobile device only while a button for activating the scrolling is pressed;
   displaying, on the display, a guide window in addition to the page currently displayed on the display while the scrolling is performed, wherein the guide window includes a miniature of the page currently displayed on the display and a location indicator indicating the location of the part currently being viewed on the display; and
   if at least part of an input area of the display overlaps an input window of the page, displaying a virtual text input panel for inputting text into the overlapped input window
   wherein the input window is an area for inputting and displaying text,
   wherein if the input area and the input window are overlapped for a predetermined time, the virtual text input panel continues to be displayed despite movement of the mobile terminal, and
   wherein if the input area and the input window are not overlapped for the predetermined time due to the movement of the mobile terminal, the virtual text input panel disappears.

2. The method according to claim 1, further comprising:
   indicating, on the display, that the overlapped input window is ready so that a user can input text into the overlapped input window.

3. The method according to claim 1, wherein the scrolling step includes at least one of the following:
   performing a zooming in/out operation on a portion of the page currently displayed on the display, according to a movement of the mobile device; and
   flipping through other pages according to a movement of the mobile device.

4. The method according to claim 1, wherein the movement of the mobile device includes at least one of rolling, pitching, yawing, and transition.

5. The method according to claim 1, wherein the display includes a touch screen.

6. The method according to claim 1, wherein in the scrolling step, only the page is scrollable while the input area is fixed on the display.

7. The method according to claim 1, wherein in the scrolling step, the input area is visible to a user.

8. The method according to claim 1, wherein in the scrolling step, the input area is invisible to a user.

9. A method of controlling a user interface of a mobile device, the method comprising:
   detecting a movement of the mobile device as applied by a user's gesture;
   scrolling a page displayed on a display of the mobile device according to the detected movement of the mobile device; and
   if at least part of an input area of the display overlaps an input window of the page, displaying a virtual text input panel for inputting text into the overlapped input window
   wherein the input window is an area for inputting and displaying text,
   wherein, if the input area and the input window are overlapped for a predetermined time, the virtual text input panel continues to be displayed despite movement of the mobile terminal, and wherein if the input area and the input window are not overlapped for the predetermined time due to the movement of the mobile terminal, the virtual text input panel disappears.

10. The method according to claim 9, wherein the scrolling is performed, when the mobile device is moved by the user's gesture made while the user presses a button on the mobile device.

11. The method according to claim 9, wherein in the scrolling step, the input window is scrolled according the movement of the mobile device while the input area is fixed on the display.

12. The method according to claim 9, wherein the input area is visible to a user.

13. The method according to claim 9, wherein the input area is invisible to a user.

14. The method according to claim 9, wherein the movement of the mobile device includes at least one of rolling, pitching, yawing, and transition.

15. The method according to claim 9, further comprising: indicating to a user when at least the part of the input area of the display overlaps the input window of the page displayed on the display.

16. The method according to claim 9, further comprising: removing the displayed virtual text input panel in response to a movement of the mobile device as applied by a predetermined gesture of the user.

17. The method according to claim 16, wherein the predetermined gesture includes tilting the mobile device, shaking the mobile device at least once, pressing a virtual button on the display, pressing a physical button on the mobile device, or touching an area of the display in a certain manner.

18. The method according to claim 9, wherein the virtual text input panel comprises a virtual keyboard or a note recognition panel.

19. The method according to claim 9, wherein the scrolling step includes at least one of the following:
performing a zooming in/out operation on a portion of the page currently displayed on the display, according to a movement of the mobile device; and
flipping through other pages according to a movement of the mobile device.

20. The method according to claim 19, further comprising:
displaying, on a portion of the display, a guide window for indicating the actual area currently displayed on the display with respect to the entire page or a plurality of pages.

21. A mobile device comprising:
a display configured to display a guide window in addition to a page currently displayed on the display while a scrolling is performed, wherein the guide window includes a miniature of the page currently displayed on the display and a location indicator indicating the location of the part currently being viewed on the display;
a detector configured to detect a movement of the mobile device as applied by a user's gesture; and
a controller, by controlling the display, configured to:
perform the scroll of the page displayed on the display according to the detected movement of the mobile device only while a button for activating the scroll is pressed, and
if at least part of an input area of the display overlaps an input window of the page, display a virtual text input panel for inputting text into the overlapped input window
wherein the input window is an area for inputting and displaying text,
wherein if the input area and the input window are overlapped for a predetermined time, the virtual text input panel continues to be displayed despite movement of the mobile terminal, and
wherein if the input area and the input window are not overlapped for the predetermined time due to the movement of the mobile terminal, the virtual text input panel disappears.

22. A mobile device comprising:
a display;
a detector configured to detect a movement of the mobile device as applied by a user's gesture; and
a controller, by controlling the display, configured to:
scroll a page displayed on the display according to the detected movement of the mobile device; and
if at least part of an input area of the display overlaps an input window of the page, display the virtual text input panel for inputting text into the overlapped input window
wherein the input window is an area for inputting and displaying text,
wherein if the input area and the input window are overlapped for a predetermined time, the virtual text input panel continues to be displayed despite movement of the mobile terminal, and
wherein if the input area and the input window are not overlapped for the predetermined time due to the movement of the mobile terminal, the virtual text input panel disappears.

* * * * *